UNITED STATES PATENT OFFICE 2,029,648

FERTILIZER PRODUCTION FROM SEWAGE

Oliver V. Austin, Hattiesburg, Miss.

No Drawing. Application September 28, 1933,
Serial No. 691,413

5 Claims. (Cl. 71—8)

My invention relates generally to a process of separating into its constituents and recovering by-products therefrom, such material as sewage, slaughter house refuse, and such as garbage, sewage sludge, screenings, street sweepings, trash and the like.

It is an important object of my invention to provide a process for treating material of the character described to produce a fertilizer material and incidentally certain valuable by-products.

It is also an important object of my invention to provide a process of the character described above which yield by-product fats, fatty acids and glycerine.

It is also an important object of my invention to provide a process of the type indicated above, the operation of which is accomplished quickly and at a minimum cost, and produces products which are readily recoverable and applied to the uses appointed therefor, or further treated and refined.

Other objects and advantages of my invention will be apparent from a reading of the following explanation and descriptions wherein I set forth a preferred embodiment of my invention.

In other processes and methods of treating waste matter known to me and heretofore used, decomposition of the waste matter by bacterial action, or by incineration, or by a combination of these methods has been utilized. The present process does not involve decomposition of the waste matter, and is quicker in action and more economical as to operating costs, and produces a greater amount of recovered products of superior character and form.

My process comprises freeing the matter to be treated of as much liquid as possible by any suitable method such as settling, floating, filtering, screening, centrifugal force, or drying; and the matter is then run into a retort, autoclave, pressure cooker, still or other closed receptacle of suitable kind.

The matter within the receptacle is then subjected to superheated steam at a pressure of up to or in the neighborhood of 1000 pounds per square inch for several minutes the precise pressure and period of subjection thereto depending upon the material being treated.

Under the above named conditions of temperature and pressure the waste matter is forced to separate into its component fats fatty acids, glycerine, and mineral and other organic matter (humus). Under these conditions the superheated steam is forced into every grain, granule, and cell of the matter.

When this permeation of the matter by the superheated steam has been accomplished, the pressure within the receptacle or retort is suddenly released. The releasing of the pressure within the retort or receptacle causes the superheated steam to explode and tear apart every particle of the material and force the disintegrated material from the receptacle or retort into a catch basin or condenser provided to receive the same, wherein the fats and fatty acid charged steam is cooled. This sudden release of pressure causes in effect a sudden release from confinement. The components or constituents of the matter in the catch basin or condenser are fats, fatty acids, soaps, glycerine, and a residue of mineral and organic matter. By reason of the difference in specific gravity and the different physical properties of these components, they readily separate, that is, the fats, fatty acids and soaps float on the surface; the glycerine remains in solution in the water from the condensed steam, and the mineral and organic matter or residue settles to the bottom. This enables skimming off the fats, fatty acids, and soaps and their recovery for any purpose desired. The mineral and organic residue is freed from the liquid in any suitable manner and utilized as a fertilizer. The glycerine is recovered from the liquid by any suitable means such as distillation.

The purpose of my invention, then, comprises the separation of the fat content (fats and fatty acids) of wastes and waste materials by subjecting said material to pressures up to one thousand pounds per square inch by means of superheated steam, allowing the mass to be forced by its internal pressure into a condensing receptacle, where by gravitation the fats, fatty acids, and soaps separate and become available for collection; or my process may be viewed as a method of manufacturing fertilizer which comprises the process stated above, supplemented by subsequent drying of the said organic and mineral residue.

While I understand that processes of disintegrating material of different kinds have heretofore been used which involve the use of superheated steam and the explosive effect described herein, it is understood that such processes have not heretofore been used for the purpose of disintegrating and separating into its constituents, waste and waste matter, so as to produce a fertilizer and valuable by-products, which constitute my invention set forth herein.

Under the conditions mentioned temperatures approximating 650 degrees centigrade are developed at the 1000 pounds per square inch pressure of the superheated steam, and the resulting hydrolysis is extremely rapid.

If desired suitable amounts of either mineral acid or alkali such as sulphuric acid or slacked lime in suitable proportions may be mixed with the waste matter prior to its subjection to the superheated steam in order to aid the hydrolysis thereof.

The solid fertilizer material resulting from my process is sterilized and perfectly balanced as to nitrogen, phosphorous, and potassium content, with the added advantage of having an average of over thirty percent of organic matter present.

Although I have shown and described herein a preferred embodiment of my invention, it is to be definitely understood that I do not desire to limit the application of the invention thereto, and any change or changes may be made in material and ingredients, and in the sequence and duration of steps and operations, within the spirit of the invention and the scope of the subjoined claims.

What is claimed is:—

1. A process of making fertilizer, said process comprising confining sewage and while so confined subjecting the same to steam at a pressure of approximately 1000 pounds per square inch for a few minutes, then suddenly releasing the pressure by discharging the sewage and steam from confinement whereby to cause the cell structure of said sewage to be explosively disintegrated.

2. A process of making fertilizer, said process comprising confining sewage and while so confined subjecting the same to steam at a pressure of approximately 1000 pounds per square inch for a few minutes, then suddenly releasing the pressure by discharging the sewage and steam from confinement whereby to cause the cell structure of said sewage to be explosively disintegrated, collecting the exploded material as it is discharged, also separating the solid constituents from the liquid constituents of said material.

3. A process of making fertilizer, said process comprising confining concentrated sewage and while so confined subjecting the same to steam at high pressure and high temperature for a few minutes, then suddenly releasing the sewage and steam from confinement whereby to cause the cell structure of the sewage to be explosively disintegrated.

4. A process of making fertilizer, said process comprising confining concentrated sewage and while so confined subjecting the same to steam at high pressure and high temperature for a few minutes, then suddenly releasing the sewage and steam from confinement whereby to cause the cell structure of the sewage to be explosively disintegrated, catching the disintegrated material, and separating the solid constituents from the liquid constituents.

5. A process of making fertilizer, said process comprising confining concentrated sewage and while so confined subjecting the same to steam at high pressure and high temperature for a few minutes, then suddenly releasing the sewage and steam from confinement whereby to cause the cell structure of the sewage to be explosively disintegrated, catching the disintegrated material, and separating the solid constituents from the liquid constituents and drying the solid constituents.

OLIVER V. AUSTIN.